(12) United States Patent
Paik et al.

(10) Patent No.: US 7,634,794 B1
(45) Date of Patent: Dec. 15, 2009

(54) BROADCASTING SERVICE SYSTEM USING MOBILE COMMUNICATION TERMINAL

(75) Inventors: Woo Hyun Paik, Seoul (KR); Bae Guen Kang, Seoul (KR); Tae Jun Park, Seoul (KR); Seng Whan Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 534 days.

(21) Appl. No.: 09/617,036

(22) Filed: Jul. 14, 2000

(30) Foreign Application Priority Data

Jul. 16, 1999 (KR) .............................. 1999-28811

(51) Int. Cl.
*H04N 5/445* (2006.01)
*H04N 7/16* (2006.01)
*G06F 13/00* (2006.01)
*G06F 3/00* (2006.01)

(52) U.S. Cl. ......................................... 725/62; 725/39

(58) Field of Classification Search .................... 725/1, 725/62, 39, 73, 81, 99; 455/556.1, 556.2, 455/557, 452.1, 453, 63.1, 3.01, 3.04–3.06, 455/426.1–426; 370/487; 375/240.01
See application file for complete search history.

(56) References Cited

U.S. PATENT DOCUMENTS

| | | | |
|---|---|---|---|
| 5,444,707 A * | 8/1995 | Cerna et al. ................. 370/389 |
| 5,559,549 A * | 9/1996 | Hendricks et al. ........... 725/138 |
| 5,574,966 A * | 11/1996 | Barzegar et al. ............. 725/62 |
| 5,812,930 A * | 9/1998 | Zavrel ......................... 725/62 |
| 5,878,324 A * | 3/1999 | Borth et al. ................. 725/62 |
| 6,005,565 A * | 12/1999 | Legall et al. ................ 345/721 |
| 6,006,318 A * | 12/1999 | Hansen et al. ............... 712/28 |
| 6,014,694 A * | 1/2000 | Aharoni et al. ............. 709/219 |
| 6,104,334 A * | 8/2000 | Allport ........................ 341/175 |
| 6,246,430 B1 * | 6/2001 | Peters et al. ............. 348/14.01 |
| 6,263,503 B1 * | 7/2001 | Margulis ...................... 725/81 |
| 6,272,575 B1 * | 8/2001 | Rajchel ....................... 710/301 |
| 6,437,836 B1 * | 8/2002 | Huang et al. .................. 725/39 |
| 6,459,906 B1 * | 10/2002 | Yang ....................... 455/556.1 |
| 6,470,378 B1 * | 10/2002 | Tracton et al. .............. 709/203 |
| 6,484,011 B1 * | 11/2002 | Thompson et al. ......... 455/3.06 |
| 6,502,242 B1 * | 12/2002 | Howe et al. .................. 725/93 |

(Continued)

FOREIGN PATENT DOCUMENTS

KR 97055875 A * 7/1997

OTHER PUBLICATIONS

IEEE 100: The Authoritative Dicttionary of IEEE Standards Terms, 2000, IEEE Press, 7th ed., pp. 1158-1159.*

(Continued)

*Primary Examiner*—Hunter B. Lonsberry
(74) *Attorney, Agent, or Firm*—Birch, Stewart, Kolasch & Birch, LLP (57) ABSTRACT

A system capable of receiving a television signal and telephone signal on a mobile communication terminal. In particular, the system is capable of displaying each television broadcast on a monitor of the mobile communication terminal by receiving the video and audio signal, decoding it, and outputting it to the monitor of the mobile communication terminal. In addition, the system can transmit an EPG (Electronic Program Guide) data corresponding to a subscriber request and a selected broadcasting program in real time.

14 Claims, 7 Drawing Sheets

U.S. PATENT DOCUMENTS

| | | | |
|---|---|---|---|
| 6,504,580 B1 * | 1/2003 | Thompson et al. | 348/734 |
| 6,754,277 B1 * | 6/2004 | Heinzelman et al. | 375/240.27 |
| 6,816,704 B1 | 11/2004 | Fukuda | |
| 6,950,624 B2 | 9/2005 | Kim et al. | |
| 2001/0008000 A1 * | 7/2001 | Kikinis et al. | 455/556 |
| 2001/0055978 A1 * | 12/2001 | Herrod et al. | 455/517 |
| 2006/0105804 A1 * | 5/2006 | Kumar | 455/550.1 |

OTHER PUBLICATIONS

Kumar, Rajendra, Portable Computing and Communication Device With Central Processor Housed in a Detachable Handset, U.S. Appl. No. 60/128,138, filed Apr. 7, 1999, entire document.*

Khansari et al., Low Bit-Rate Video Transmission over Fading Channels for Wireless Microcellular Systems, Feb. 1996, IEEE Transactions on Circuits and Systems For Video Technology, vol. 6, No. 1, pp. 1-11.*

Hsu et al., Rate Control for Robust Video Transmission over Burst-Error Wireless Channels, May 1999, IEEE Journal on Selected Areas in Communications, vol. 17, No. 5, pp. 756-773.*

Dunlop, J., Potential for compressed video transmission over the GSM HSCSD service, Jan. 16, 1997, Electronics Letters, vol. 33, No. 2, pp. 121-122.*

Puri et al., MPEG-4: An object-based multimedia coding standard supporting mobile applications, 1998, Baltzer Science Publishers BV, Mobile Networks and Applications 3 (1998) 5-32, pp. 5-32.*

* cited by examiner

BROADCASTING SERVICE SYSTEM USING MOBILE COMMUNICATION TERMINAL

BACKGROUND OF THE INVENTION

1. Field of the Invention

The present invention relates to a system which is capable of receiving a broadcasting signal and a telephone signal, and watching and listening to them on a mobile communication terminal, and in particular to a system which is capable of receiving a video signal and an audio signal, decoding them, and displaying the decoded signals on the monitor of the mobile communication terminal.

2. Description of the Prior Art

Organic combination or link between the conventional personal mobile communication system and digital television system for maximizing advantages of both systems is not accomplished. In addition, in the digital television system, various additional information with high quality images are only provided to digital television sets. In other words, the conventional personal mobile communication system such as a cellular phone cannot transmit and receive video, audio and character information.

SUMMARY OF THE INVENTION

It is an object of the present invention to provide a broadcasting service system using a mobile communication terminal which is capable of watching television broadcasting on a mobile communication subscriber terminal, when a mobile communication network subscriber wants to watch broadcasting. The system is capable of recognizing and answering the subscriber request, providing broadcasting information, and controlling digital and analog broadcasting signals to transmit on the subscriber terminal through the mobile communication network.

Another object of the present invention is to provide a subscriber terminal, when analog and digital moving picture broadcasting signals are converted according to signal standard of the mobile communication network, which is capable of receiving and restoring the converted analog and digital moving picture information, and outputting images and sounds.

Another object of the present invention is to provide a broadcasting signal selecting unit which is capable of selecting broadcasting information, receiving and restoring the selected broadcasting signal in order to watch digital and analog television broadcasting.

Another object of the present invention is to provide a broadcasting service method using a mobile communication terminal which is capable of converting digital and analog broadcasting signals in real time according to a transmission standard of the mobile communication network, and transmitting the converted broadcasting signals through the mobile communication network, watching the transmitted television signals on the subscriber terminal.

To achieve the objects, the broadcasting service system using the mobile communication terminal includes a converting unit which receives a video and audio signal provided from the moving picture information and converts the video and audio signal, and a transmitting unit which transmits the converted video and audio signal to a subscriber through a certain transmission line of the mobile communication network.

To achieve the objects of the present invention, in order to receive broadcasting signals, the mobile communication terminal includes a receiving unit which receives the digital video and audio data, a decoding unit which decodes the received digital video and audio data, and an outputting unit which outputs the decoded video and audio signal.

To achieve the objects of the present invention, the mobile communication subscriber terminal includes a broadcasting reception unit which receives the broadcasting signal as a moving picture information, a communication process unit which receives, restores a call signal provided to a subscriber and outputs it through the mobile communication network, and coding-outputs a transmitting call signal through the mobile communication network, a decoding unit which restores the received broadcasting signal by the broadcasting reception unit, an output unit which outputs the broadcasting signal restored by the decoding unit to a terminal to be watched, and a selecting unit which selects the broadcasting signal reception mode and mobile communication call mode.

To achieve the objects of the present invention, the broadcasting service method using the mobile communication terminal includes a converting process which converts the broadcasting signal having the digital video and audio data into a data agreed with the signal and transmission standard of the mobile communication network, and a transmission process which transmits the converted digital video and audio data to the subscriber through a certain transmission channel of the mobile communication network.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
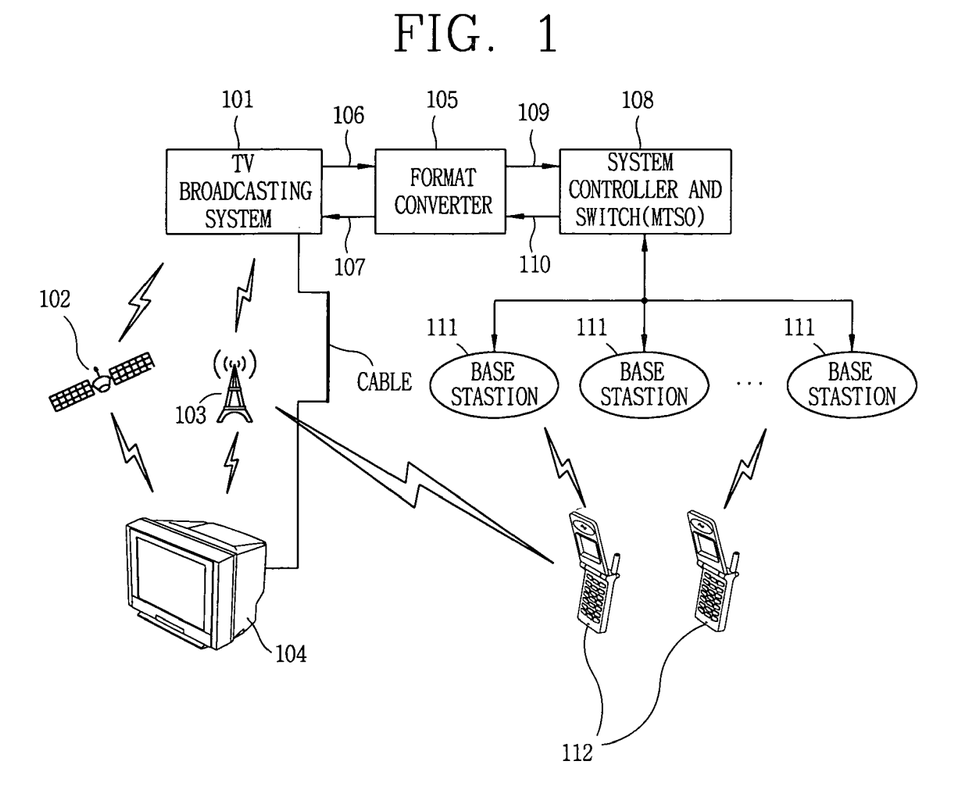
FIG. 1 is a schematic block diagram illustrating the structure of a broadcasting service system using a mobile communication terminal according to the preferred embodiment of the present invention.

FIG. 1 is a schematic block diagram illustrating the structure of a broadcasting service system using a mobile communication terminal of the preferred embodiment of the present invention. As depicted in FIG. 1, a television broadcasting system 101 transmits a video and audio signal to a subscriber terminal 104 through a satellite network 102, a television broadcasting network 103 or a cable network (Cable). The subscriber terminal 104 receives the video and audio signal, and outputs an image and sound by decoding the video and audio signal.

Herein, the television broadcasting system 101 may be a moving picture and audio information broadcasting system, an analog television broadcasting system, a digital television broadcasting system, or other moving picture information broadcasting system.

The conventional analog broadcasting system includes a NTSC (National Television System Committee) broadcasting method, a PAL (Phase Alternation Line) broadcasting method, and a SECAM (Sequential Couleur Avec Memoire) broadcasting method, which are commonly used.

And the conventional digital broadcasting system includes a ATSC (Advanced Television Systems Committee) method of America, a DVB (digital Video Broadcasting) method of Europe, and a digital broadcasting method of Japan. Herein, the ATSC method of America adopts a MPEG2 (Moving Picture Experts Group 2), Dolby AC3 and 8VSB, and the DVB method of Europe adopts a MPEG2 (Moving Picture Experts Group 2) and an OFDM (Orthogonal Frequency Division Multiplexing).

As described above, in the digital television broadcasting system, the video and audio signals are provided as a compressed digital data (bit stream). Herein, the compressed digital data has a protocol in relation to reception and transmission. Accordingly the digital broadcasting information agreed with the protocol includes the video and audio data and EPG (Electronic Program Guide) and additional data, which are processed together.

In FIG. 1 of the present invention, processing of the digital video signal compressed as the MPEG2 (Moving Picture Experts Group 2) is described.

When the television broadcasting system 101 is the digital television broadcasting system, the video information provided to the digital television is a compressed-encoded information as the MPEG2 (Moving Picture Experts Group 2) standard over communication path 106. Accordingly a format converter 105 for converting the compressed-encoded information into an MPEG4 (Moving Picture Experts Group 4) used as an image standard of the mobile communication network is included.

Meanwhile, when the television broadcasting system 101 is the analog television broadcasting system, the television broadcasting system 101 (moving picture provider) or the format converter 105 can have a converting unit which converts the provided video information into a digital signal having a certain format used in the mobile communication network transmission standard.

The format converter 105 receives the MPEG2 (Moving Picture Experts Group 2) videotext provided from the television broadcasting system 101, and format-converts the MPEG2 videotext into the MPEG4 (Moving Picture Experts Group 4) videotext used in the mobile communication network.

The format converter 105 will be described with reference to the accompanying FIG. 5B.

The format converter 105 can convert the MPEG2 (Moving Picture Experts Group 2) videotext into H.26L, H.263, or H.26X format. As far as the converted format agrees with the mobile communication network, there is no limitation in the format.

The format converter 105 exchanges the information needed in the format conversion with the television broadcasting system 101 through a transmission line 107.

The format converter 105 will be described in detail.

For example, the bit rate of the digital television adapts high speed broadcasting band, such as 19.236 Mbps of HD level, or 6 Mbps of SD level.

However, the data transmission rate of IMT-2000 is maximum 144 Kbps or 2 Mbps (in case of a Pico Cell) according to a Cell. Likewise, on the mobile communication network which can process maximum 2 Mbps two-way signal, transmitting the digital television signal directly to a cellular phone or PCS is impossible due to the distinctive character of the mobile communication network.

Therefore the format converting process which converts the MPEG2 digital television signal into the signal used in the mobile communication network such as the MPEG4 (Moving Picture Experts Group 4) is required. The format converter 105 performs transcoding of the video and audio data, formats and converts the EPG (Electronic Program Guide) and additional information of the digital television information to make the signals agree with the mobile communication network.

The converted digital video and audio data information is provided to a MTSO (System Controller and Switch) 108 through a transmission line 109. The MTSO 108 provides a signal for answering a request from a subscriber to the format converter 105 through a transmission line 110, allots the digital video and audio information to a certain channel of the mobile communication network, and transmits the digital information as a RF frequency to a subscriber terminal 112 through a base station.

As described above, the video and audio signals of the television broadcasting system 101 are converted into the signals used in the mobile communication network, and are transmitted to the subscriber terminal 112. Accordingly it is possible to watch the television broadcasting on the subscriber terminal (cellular phone, PCS, IMT-2000 terminal).

Figure 2:
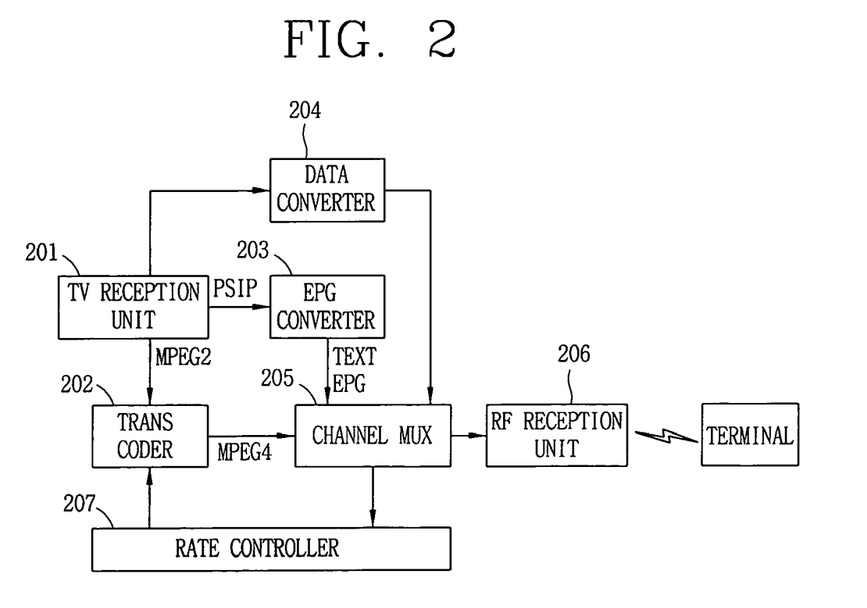
FIG. 2 is a block diagram illustrating the broadcasting service system using the mobile communication terminal according to the preferred embodiment of the present invention.

FIG. 2 is a block diagram illustrating the operation of the broadcasting service system using the mobile communication terminal of the present invention. It depicts the preferred embodiment of the system including the format converter 105 and the server (MTSO) 108 and the base station 111.

When a moving picture information is the digital television broadcasting system, a television reception unit 201 receives the additional information including the digital video, audio information and the EPG (Electronic Program Guide) data used in the digital television broadcasting system, and transmits the MPEG2 (Moving Picture Experts Group 2) signal to a transcoder 202. The television reception unit 201 abstracts the EPG (Electronic Program Guide) data and transmits it to a EPG converting unit 203, and abstracts the additional data and transmits it to a additional data converting unit 204.

The transcoder 202 converts the inputted MPEG2 (Moving Picture Experts Group 2) digital video and audio data into the MPEG4 (Moving Picture Experts Group 4) digital video and audio data, and transmits it to a channel multiplexer 205.

Since the digital video data transmission media are not the same, and the characters of each media are different, there is a need to ensure that the bit rate and converting method of the digital image agree with the media character during the transmission.

In particular, the system of the present invention provides the digital television broadcasting signal to the mobile communication terminal such as the cellular phone or PCS through the mobile communication network, by converting the digital video data to a format compatible with the medium having a different bandwidth.

The EPG converting unit 203 decodes the inputted MPEG2 EPG data, and converts it into the MPEG4 EPG data.

The additional data converting unit 204 decodes the inputted MPEG2 additional data into the MPEG4 additional data.

The EPG and additional data can be converted into the data used in a wireless Internet network.

The channel multiplexer 205 puts the MPEG4 video and audio data provided from the transcoder 202 on a certain allotted channel, and at the same time puts the EPG data outputted from the EPG converting unit 203 and the additional data outputted from the additional data converting unit 204 on a certain allotted channel.

The MPEG4 (Moving Picture Experts Group 4) digital television video, audio, EPG (Electronic Program Guide) and additional information converted in accordance with the character of the mobile communication network by passing through the above process are transmitted to the subscriber mobile communication terminal through a RF (Radio Frequency) reception unit 206.

The RF reception unit 206 corresponds to the server (MTSO) 108, or to the base station of the mobile communication network.

In SD level of the MPEG (Moving Picture Experts Group 2), 6 Mbps band is required; in HD level, approximately a 19 Mbps band is required; and when the MPEG2 is converted into the MPEG4 (Moving Picture Experts Group 4), a moving picture can be transmitted at about a 64 Kbps bit rate. Herein, the moving picture can be transmitted by being allotted a part of the IMT-2000 band as a television broadcasting band.

Meanwhile, when moving picture information is transmitted as a packet in order to transmit the moving picture information through an exclusive broadcast channel (transmission line), in consideration of the character of the mobile communication network, a voice band is changeable on one base station in accordance with a subscriber telephone call quantity. At this time television broadcasting information should not take all the bandwidth. Accordingly a bandwidth controlling method for a changeable bandwidth allotment is required.

When a BW-video means a moving picture (including sound) band for the digital television broadcast, and a BW-audio means audio band for voice communication of the mobile communication terminal, the size of the audio band changes from 0 to a maximum BW-audio, in accordance with the voice telephone call quantity.

Accordingly, the channel multiplexer 205 provides voice telephone call quantity information to a transmission rate control unit 207 in accordance with the voice telephone call quantity, the transmission rate control unit 207 controls encoding rate of the MPEG4 (Moving Picture Experts Group 4) of the transcoder 202 by using the provided information from the channel multiplexer 205.

In addition, as described above, the digital television broadcasting can service not only the video and audio information, but also additional information, the additional information is provided to a subscriber through the additional information converting unit 204 and channel multiplexer 205.

Figure 3:
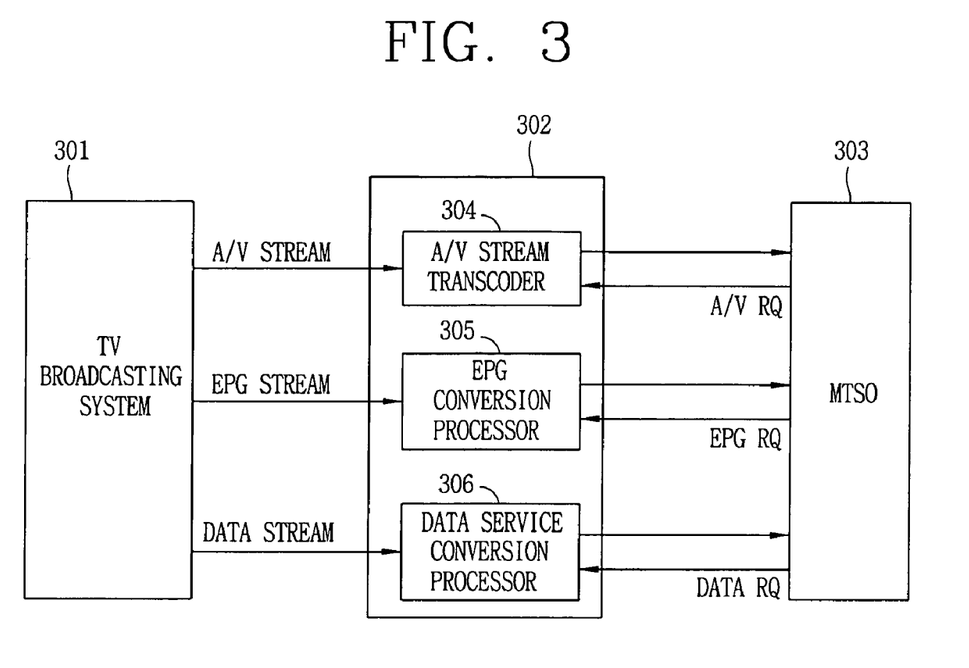
FIG. 3 is a block diagram illustrating the operation of the format converter of the present invention.

FIG. 3 is a block diagram illustrating the preferred embodiment of the format converter of the present invention. It shows the construction of the format converting system which comprises a transcoder, a EPG (Electronic Program Guide) data converting unit, and a data service converting processor.

Herein, a format converter 302 for converting the signal inputted from the television broadcasting system 101, 301 into the signal used in a mobile communication network 303 is shown. The format converter 302 includes an A/V stream transcoder 304 which receives an A/V stream from the television broadcasting system and converts it into the format agreed with the mobile communication network, an EPG converting processor 305 which receives an EPG (Electronic Program Guide) stream from the television broadcasting system and converts it into the format agreed with the mobile communication network, and a data service converting processor 306 which receives a data stream from the television broadcasting system and converts it into the format agreed with the mobile communication network.

First, the A/V stream transcoder 304 converts the MPEG2 (Moving Picture Experts Group 2) digital video (including audio) information into the MPEG4 (Moving Picture Experts Group 4) or H.26L, H.263, H.26X format, and provides it to the mobile communication network 303. Herein, the converted digital video data can be provided to the subscriber in accordance with a subscriber request (A/V RQ) of the mobile communication network 303.

The EPG converting processor 305 converts the MPEG2 EPG stream inputted from the television broadcasting system into the signal used in the mobile communication network.

Figure 4:
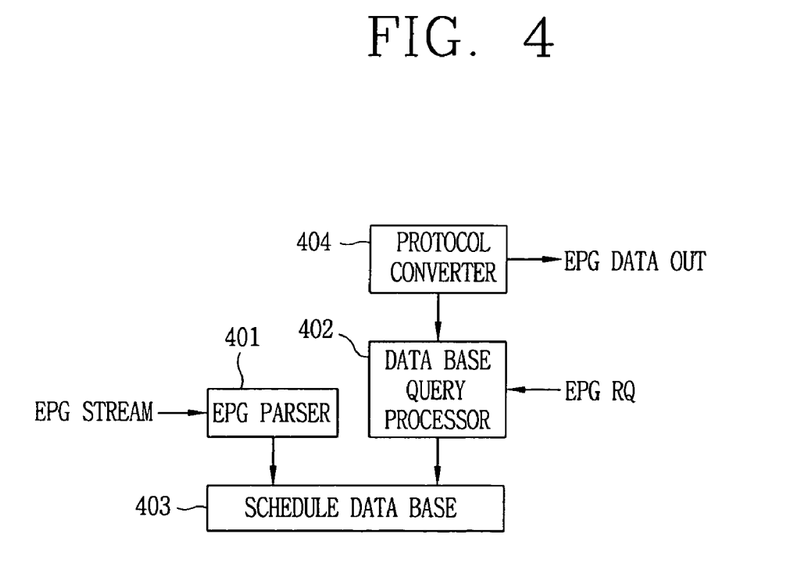
FIG. 4 is a block diagram illustrating the operation of the EPG (Electronic Program Guide) converting processor of the present invention.

FIG. 4 is a block diagram illustrating the embodiment of the EPG converting processor of the present invention. As depicted in FIG. 4, the EPG converting processor 305 inputs the EPG information inputted from a PSIP (Program Stream Internet Protocol) table, performs format-decoding, abstracts needed information such as transmission rate of program or bit by filtering the format-decoded information, format-converts the abstracted information, and constructs it in order to satisfy a wireless data protocol.

Herein, format-conversion in WAP (Wireless Application Protocol), PSIP (Program Stream Internet Protocol) text is converted into HDML (Handheld Device Mark-up Language) or TTML (Tagged Text Mark-up Language). In format-conversion in wireless data protocol, the PSIP is converted into HDTP (Handheld Device Transport Protocol) or ITTP (Intelligent Terminal Transfer Protocol).

FIG. 4 shows an EPG analysis unit 401, an EPG answering control unit 402, a schedule data base 403, and a protocol converter 404.

First, the EPG analysis unit 401 analyzes the inputted EPG guide stream according to a encoded format, abstracts information in relation to channel and schedule of broadcasting programs, and stores the abstracted result on the schedule data base 403.

The schedule data base 403 records and stores the inputted information from the EPG analysis unit 401 on a memory, and checks and outputs a certain information of the data base in accordance with a request from the EPG answering control unit 402.

The EPG answering control unit 402 operates in accordance with the EPG answering request (EPG RQ) from the subscriber through the server MTSO 303, searches the information corresponding to the subscriber request on the schedule data base 403, and transmits it to the protocol converter 404.

The protocol converter 404 converts the data inputted from the EPG answering control unit 402 into a format used in the MTSO 303, and outputs it to the MTSO 303 for answering the subscriber request and displaying the data to the subscriber on the mobile communication terminal.

Meanwhile, the service converting processor 306 is inputted the additional information (data stream) from the television broadcasting system 301, converts it into a format used in the mobile communication network, and provides the information corresponding to the subscriber request (Data RQ).

In other words, the data service converting processor 306 performs the bit rate and protocol conversion process which converts the digital television broadcasting contents into the contents format used in the mobile communication network.

For example, the service information of the digital television broadcasting system is decoded by a MHEG-5 engine or an XHTML browser, and the decoded information is converted into the signal and format used in the mobile communication network.

Herein, in the WAP conversion, Carousel/IP Datagram is converted into HDTP (High Definition Transport Protocol), and MHEG/XHTML (Multimedia and Hypermedia Expert Group/XHyper Text Markup Language) is converted into HDML (Handheld Device Mark-up Language).

Figure 5A:
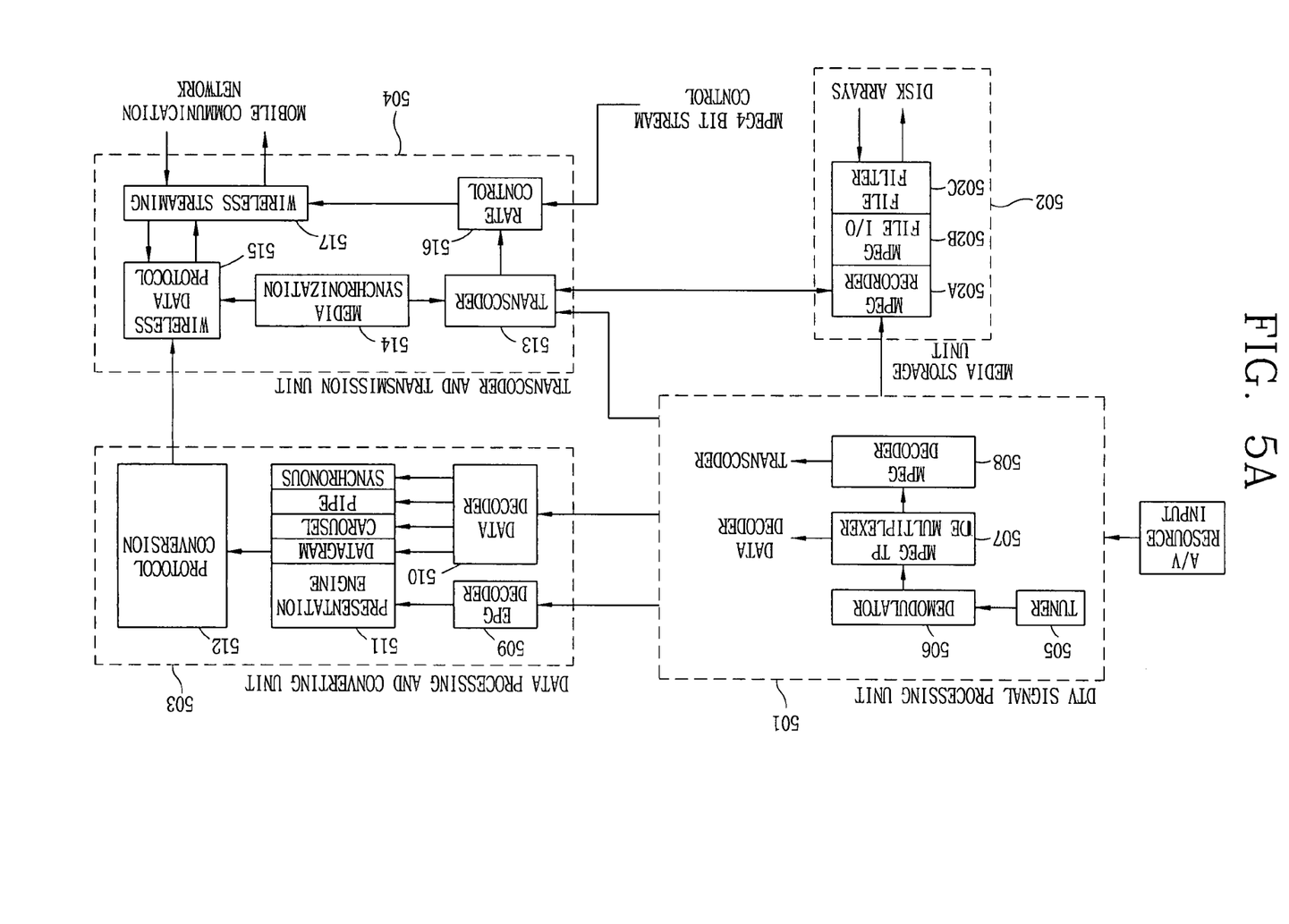
FIG. 5A is a block diagram illustrating the operation of the digital broadcasting service system of the present invention in relation to a video and audio formation process and mobile communication network matching.

FIG. 5A is a block diagram illustrating the operation of the preferred embodiment of the digital broadcasting service system in relation to processing of video, audio and additional information, and matching the processed information with the mobile communication network of the present invention.

As depicted in FIG. 5A, the digital broadcasting system using the mobile communication comprises a digital signal processing unit 501, a medium storing unit 502, a data processing/converting unit 503, and a transcoder/transmission unit 504.

Next, the operation of the digital broadcasting system shown in FIG. 5A will be described in detail.

The digital signal processing unit 501 is a information program transmission unit which provides broadcasting program to the mobile communication network by receiving a 19.2 Mbps HD level and a 6 Mbps SD level multi-channel digital television signal.

The digital signal processing unit 501 selects the inputted digital television signal on a tuner 505, demodulates the selected signal on a demodulating unit 506, abstracts information in accordance with each broadcasting channel on a demultiplexer 507, and then reproduces and outputs the video and audio signal as the original digital television broadcasting signal by a MPEG decoder 508.

Herein, the MPEG TP de-multiplexer 507 abstracts the data, regardless of the format, for providing PSI (Program System Information), guide information and additional information.

The medium storing unit 502 includes a MPEG recorder 502A, a MPEG file input/output unit 502B, and a file filter 502C. It is a file system to make a disk scheduling and disk data block size agree with the MPEG stream for storing a digital television broadcasting signal maximum 30 Mbps level MPEG2 stream in real time. The medium storing unit 502 stores a stream such as the MPEG4 itself, and services it to the mobile communication network.

Herein, a striping method is used to store the MPEG2 transmission stream transmitted from the digital television broadcasting signal reception unit as a consecutive block unit. The transcoder 513 may support GOP unit, I-Frame Value on the file system in order to effectively operate Bit Rate Drop, Macro Block, and Intra/Inter compensation.

A data processing/converting unit 512 includes an EPG decoder 509, a data decoder 510, a presentation engine unit 511, and a protocol converting unit 512.

As described above, the data processing/converting unit 512 abstracts and converts the EPG and additional information received from the digital television broadcasting being used by a mobile communication terminal user.

The EPG decoder 509 abstracts and decodes the EPG data inputted from the digital signal processing unit 501.

The presentation engine unit 511 contents-format-converts the decoded EPG data, and outputs it to the protocol converting unit 512.

Herein, as described above, the format conversion in the WAP (Wireless Applications Protocol), PSIP (Program Stream Internet Protocol) text is converted into HDML (Handheld Device Mark-up Language) or TTML (Tagged Text Mark-up Language). On the other hand, in the wireless data protocol, PSIP (Program Stream Internet Protocol) is converted into HDTP Handheld Device Transport Protocol), ITTP (Intelligent terminal Transfer Protocol).

The data decoder 510 abstracts and decodes the additional service information from the inputted data.

In addition, the presentation engine unit 511 contents-format-converts the decoded additional service information, and outputs it to the protocol converting unit 512.

Herein, in wireless internet WAP converting, Carousel/IP Datagram agrees with HDTP, and MHEG/XHTML agrees with HDML.

The protocol converting unit 512 converts the additional information, including the format-converted EPG data, into a protocol used in the mobile communication network, and outputs it.

The transcoder 513 converts the digital video (including audio) broadcasting signal inputted from the digital signal processing unit 501 into the signal used in the mobile communication network. For example, it can convert the MPEG2 into the MPEG4, and provides the converted digital video and audio data to a wireless stream processing unit 517 in accordance with transmission control of a transmission rate control unit 516.

Figure 5B:
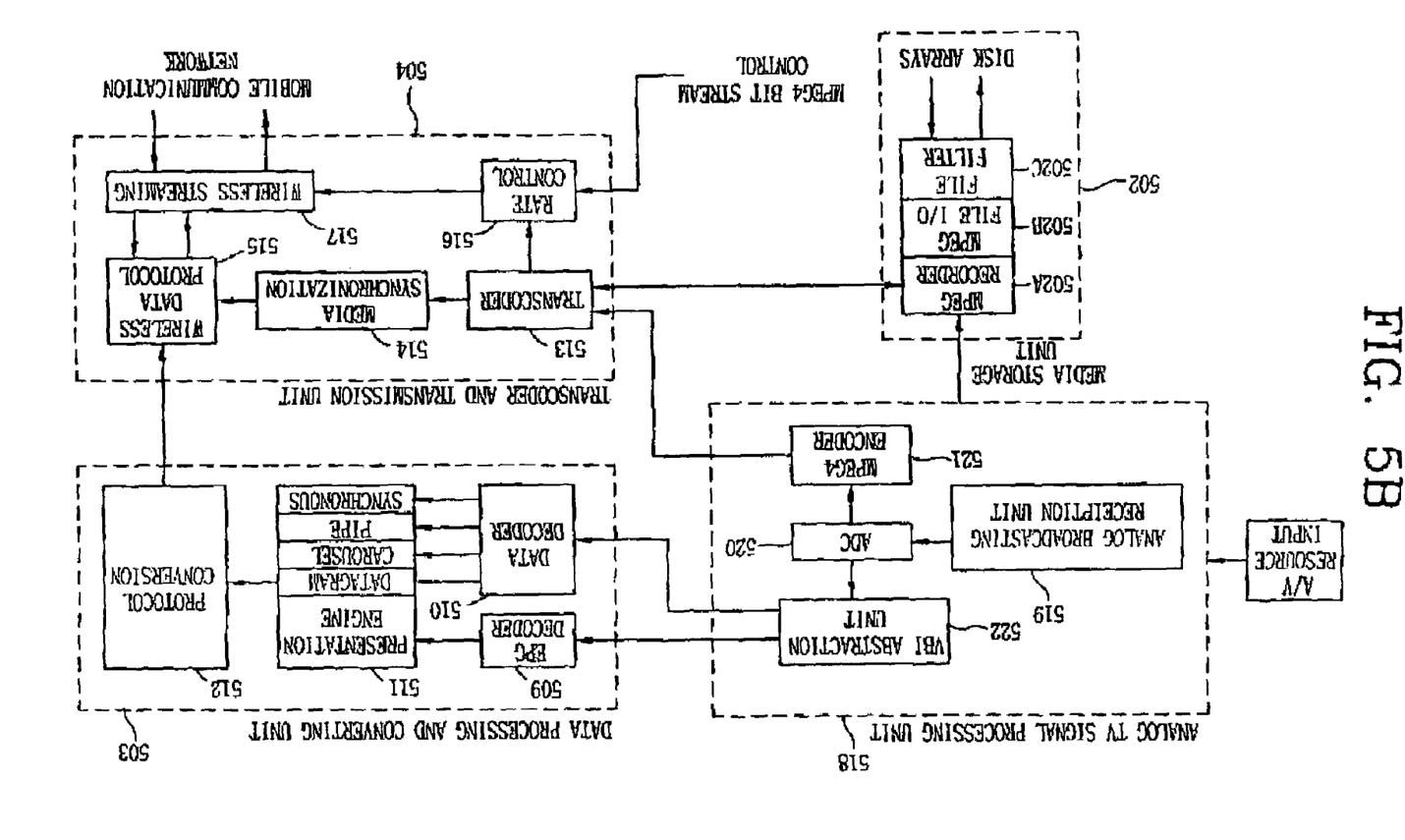
FIG. 5B is a block diagram illustrating the operation of the analog broadcasting system of the present invention in relation to a video and audio information process and mobile communication network matching.

FIG. 5B is a block diagram illustrating the analog broadcasting service system in relation with processing of video, audio and additional information and matching with the mobile communication network. As depicted in FIG. 5B, the analog television broadcasting system using the mobile communication comprises an analog signal processing unit 518, the medium storing unit 502, the data processing/converting unit 503, and the transcoder/transmission unit 504.

Next, the analog broadcasting system shown in FIG. 5B will be described in detail.

The medium storing unit 502, data processing/converting unit 503 and transcoder/transmission unit 504 are same in FIG. 5A, thus description of the parts is abridged.

The analog signal processing unit 518 includes an analog broadcasting signal reception unit 519, an analog digital converting unit 520, a MPEG4 encoder 521, and a VBI abstraction unit 522. Herein, the analog signal processing unit 518 is information program transmission unit for receiving the analog television signal and providing the broadcasting program to the mobile communication network.

In addition, the analog signal processing unit 518 includes an analog broadcasting reception unit 519, which receives and restores the analog television signal; an analog digital converting unit 520, which converts the restored analog broadcasting signal (including moving picture and audio information) into a digital data; a MPEG4 encoder 521, which converts the converted digital data into MPEG4 (Moving Picture Experts Group 4) format and outputs it to the transcoder/transmission unit 504; and the VBI abstraction unit 522, which abstracts the EPG (Electronic Program Guide) data and additional data on the VBI section, and provides it separately to the EPG decoder 509 and the additional data decoder 510.

The description of the operation of the analog system shown in FIG. 5B is the same description as the digital system shown in FIG. 5A and thus is abridged.

Accordingly, when the moving picture information is an analog television broadcasting signal, a broadcasting service using the mobile communication is possible.

Figure 6:
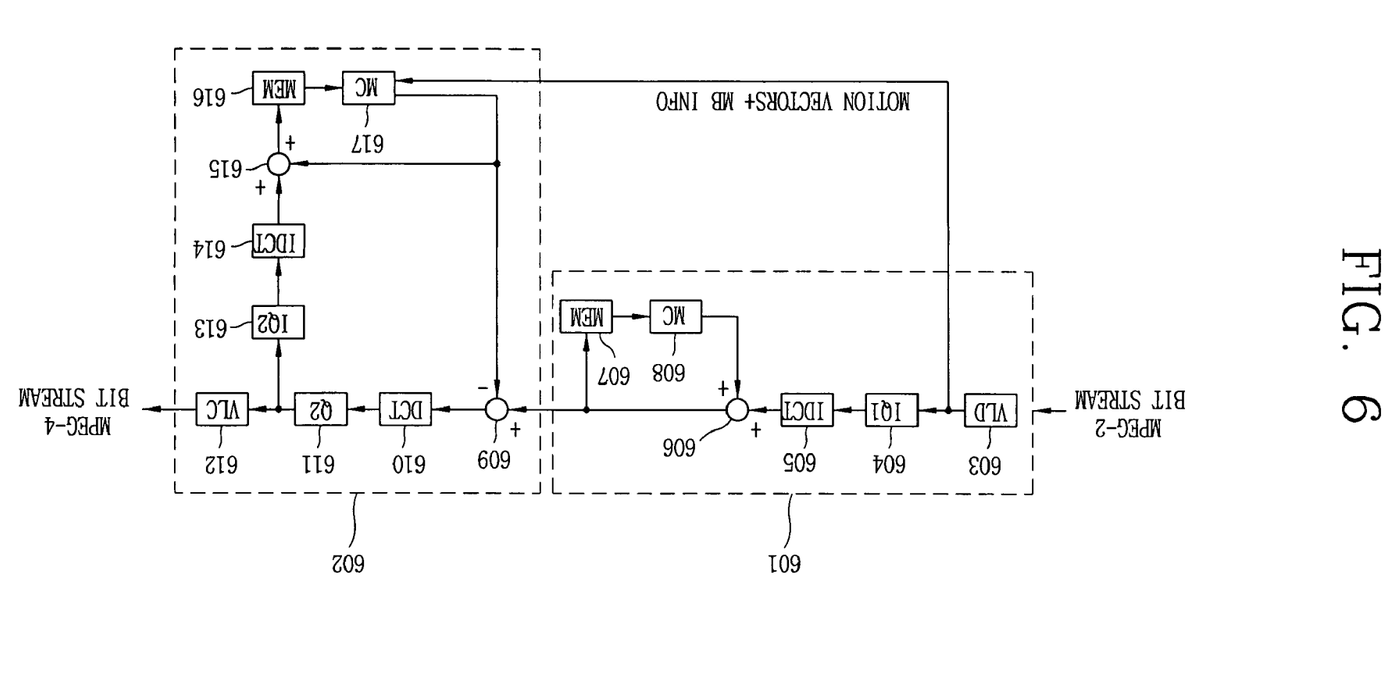
FIG. 6 is a block diagram illustrating the operation of the transcoder of the present invention.

FIG. 6 is a block diagram illustrating the operation of the transcoder of the present invention for converting the MPEG2 (Moving Picture Experts Group 2) into the MPEG4 (Moving Picture Experts Group 4).

As depicted in FIG. 6, when H.26L, H.263, H.26X are the digital video and audio data formats used in the mobile communication network, a construction of a circuit and an algorithm for converting these formats is possible.

As described above, in order to transmit a television broadcasting signal by using a wireless communication network in real time, the television broadcasting signal has to agree with the character of the wireless communication network. In other words, transcoding has to be performed between the different systems. Herein, in order to prevent video (image) deterioration due to the transcoding, a certain pertinent transcoding method can be selected from different transcoding methods.

In addition, without passing through the transcoding process, transmitting digital television broadcasting information is possible by using the digital compressed algorithms such as MPEG4 (Moving Picture Expert Group 4) or H.263.

The circuit of FIG. 6 includes a decoder unit 601 which is inputted the MPEG2 (Moving Picture Experts Group 2) bit stream and decodes it, and encoder unit 602 which encodes the decoded restoration digital video data into the MPEG4 (Moving Picture Experts Group 4) bit stream. Next, its operation will be described in detail.

First, the decoded video data on a variable signal decoder 603 of the decoder unit 601 is converted into reverse quantization and IDCT (Inverse Discrete Cosine Transform) through a reverse quantization unit 604 and IDCT Inverse Discrete Cosine Transform) unit 605. The converted reverse quantization and IDCT are decoded perfectly by passing through motion compensation process of the output device including an adder 606, a memory 607 and a motion compensation unit 608.

The encoding unit 602 encodes the restored digital video data according to quantization step which is different with the above decoding quantization step (in the present invention, the MPEG2 (Moving Picture Experts Group 2) is converted into the MPEG4 (Moving Picture Experts Group 4), quantization step of the encoder is lager than quantization step of the decoder), the digital compressed video data coated with the MPEG4 is outputted.

In order to compress and process the digital video data, the encoder unit 602 discrete-cosine-converts the difference between inputted video and restored video outputted through an adder 609, a DCT (Discrete Cosine Transform) unit 610 outputs it, a quantization unit 611 makes the signal inputted from the DCT unit 610 quantized, and a variable signal encoder 612 converts the quantized signal into the MPEG4 bit stream and outputs it. The outputted data from the quantization unit 611 is restored through the reverse quantization unit 613 and IDCT (Inverse Discrete Cosine Transform) unit 614, the balance between the restored video data and the inputted video data of the adder 609 is calculated by passing through the motion compensation process of the adder 615, memory 616 and a motion compensation unit 617, and, as a result, the calculated balance is discrete-cosine-transformed and quantized.

Accordingly, the data transcoded by the above process is inputted to a transmission rate control unit 516 in FIGS. 5A and 5B, is controlled as transmission rate agreeable to the mobile communication network, and is inputted to a wireless network stream processing unit 517.

Meanwhile, a wireless network data protocol processing unit 515 designates a data protocol compatible with the mobile communication network, such as a HDTP (High Definition Transport Protocol) or a ITTP (Intelligent Terminal Transfer Protocol) on the WAP (Wireless Application Protocol), and with the EPG (Electronic Program Guide) data, and additional data outputted from the protocol converting unit 512 of the data processing/converting unit 503.

When the user of mobile communication terminal initiates a search for a certain broadcasting schedule by sending a key word such as an program title or an actor name, the wireless network data protocol processing unit 515 supports the data base of the presentation engine unit 511 to easily search for the program schedule or the program concept.

The medium synchronization control unit 514 reconstructs the transcoded video and audio data by the transcoder 513 and the converted data by the data processing/converting unit 503, and provides the data which does not require synchronization directly to the wireless stream processing unit 517.

In other words, the medium synchronization control unit 514 resynchronizes the lost synchronization information of the synchronized broadcasting data with the closest video and audio data through the transcoder 513.

As described above, the reconstructed digital video, audio and additional information used in the mobile communication network are inputted to the wireless stream processing unit 517.

The wireless stream processing unit 517 transmits the moving picture and data to pertinent channel of the mobile communication network in real time, and performs channel allocation or cancellation in relation to the digital television signal transmission for answering request of the subscriber.

Figure 7:
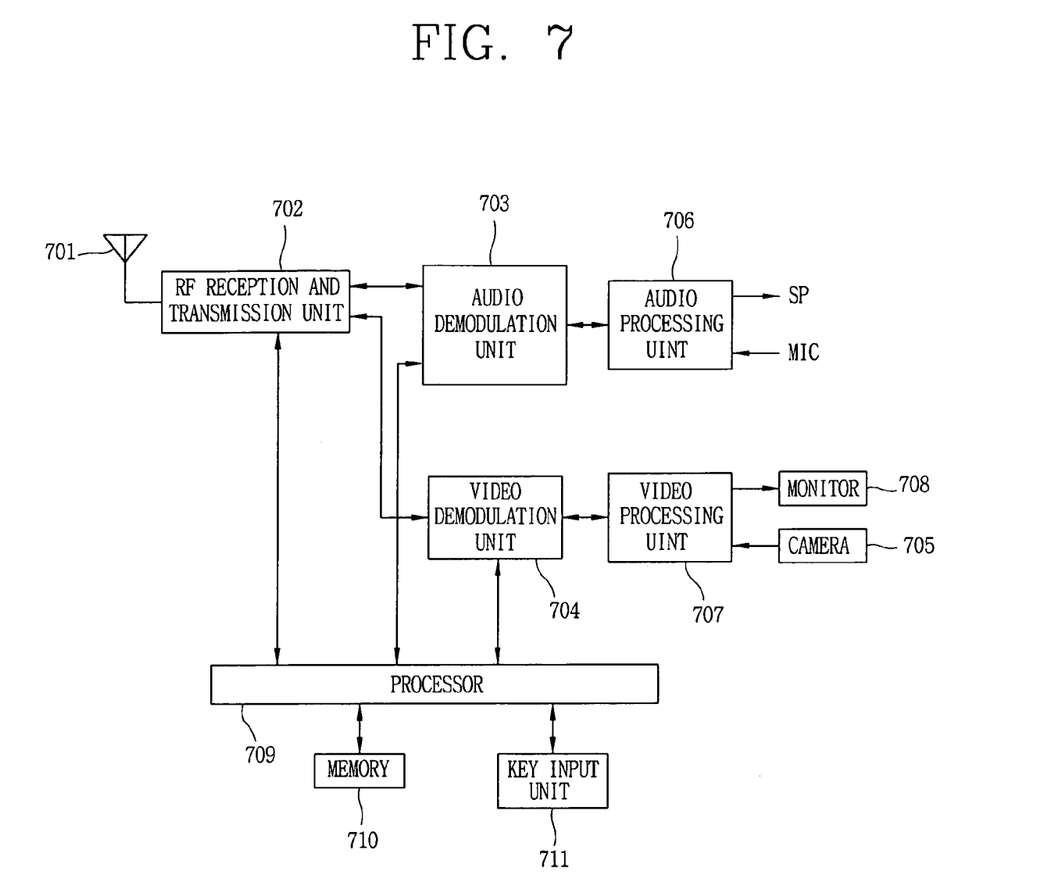
FIG. 7 is a block diagram illustrating the operation of the mobile communication terminal of the present invention.

FIG. 7 is a block diagram of the preferred embodiment of the mobile communication terminal 112 of the present invention. It describes the construction of the mobile communication terminal receiving the television signal transmitted from the mobile communication network.

Next, the construction and operation of the mobile communications terminal 112 will be described in detail.

First, a RF reception and transmission unit 702 receives and transmits the base station communication signal received from an antenna 701 and the signal for voice telephone call communication, and receives the television broadcasting signal transmitted to pertinent call channel.

In the voice telephone call communication, a voice telephone call is initiated from a "calling" party to a "called" party using a mobile communication terminal 112. The "called" party terminal receives the voice signal of the "calling" party on its RF transmission and reception unit 702. Then, a voice encoding and decoding unit 703 of the "called" terminal 112 duplicates the received voice signal, and outputs it to a voice processing unit 706.

The voice processing unit 706 outputs the duplicated voice signal to a speaker SP, encodes the duplicated voice signal through a microphone MIC of the subscriber terminal, and transmits it to the RF reception and transmission unit 702.

A video encoding and decoding unit 704 performs a MPEG4 decoder function. In the preferred embodiment of the present invention, the MPEG decoder is included in order to reproduce the transcoded MPEG4 (Moving Picture Experts Group 4) video data, which is transmitted through the mobile communication network. On the other hand, a H.263 codec may be included in the IMT-2000, in accordance with circumstance of the mobile communication network.

Accordingly, in order to process moving picture information in the particular format used in the mobile communication network, various standard codecs can be included.

In the television broadcasting reception mode, the video encoding and decoding unit 704 receives the MPEG4 (Moving Picture Experts Group 4) digital video signal inputted from the RF reception and transmission unit 702, restores it, and outputs the restored television video signal to a monitor 708 through a video processing unit 707.

In the mobile communication system having two-way monitor communication function, a camera 705 transmits a signal having the photographed subscriber image by passing through the video processing unit 707, the video encoding and decoding unit 704, and the RF reception and transmission unit 702.

A processor 709 having the voice telephone call mode and television reception mode controls the each construction unit in accordance with the mode, reads information on a memory unit 710, and stores information on the memory unit 710.

A key input unit 711 has designated keys for the television reception with a key input function for telephone calls.

FIG. 7 is a block diagram illustrating the operation of the mobile communication terminal of the present invention. When the television broadcasting signal is converted into the signal used in the mobile communication network, the mobile communication terminal receives it, restores it into video and audio, and outputs it.

However, as described above, when the RF reception and transmission unit 702 includes a TV tuner, although the television signal is not converted into a signal used in the signal transmission standard of the mobile communication network, the mobile communication terminal of the present invention can receive, restore, and output the analog or digital television broadcasting signal.

Herein, in the subscriber mobile communication terminal which receives the analog television broadcasting signal, the RF reception and transmission unit 702 performs a tuner function which receives the analog television broadcasting signal from the antenna 701 and selects it, the voice processing unit 706 processes the voice signal of the selected channel broadcasting signal of the RF reception and transmission unit (hereinafter referred to tuner) 702, and the video processing unit 707 processes the video signal of the selected channel broadcasting signal, and outputs it to the monitor 708 in order to display.

As described above, the subscriber mobile communication terminal receiving the analog television broadcasting signal includes the antenna, the tuner, the video and audio processing unit, in FIG. 7. However, the video and audio encoding and decoding unit can be excluded. As for the antenna, speaker, and monitor of the above construction, the antenna, speaker, and monitor of the conventional cellular phone, PCS, and IMT-2000 terminal can be used.

Meanwhile, in the subscriber mobile communication terminal, the RF reception and transmission unit (tuner) 702 receives the digital television broadcasting signal from the antenna 701 and selects it, the voice decoding unit 706 outputs the restored voice signal to the speaker SP, the video decoding unit 704 restores the video signal of the selected digital broadcasting signal, and the video processing unit 707 processes the restored video signal and outputs it to the monitor for displaying.

As described above, the subscriber mobile communication terminal which includes a decoding unit which decodes the digital video and audio signal, the antenna, speaker and monitor of the conventional PCS, cellular phone and IMT-2000 terminal, can be used as it is.

Figure 8:
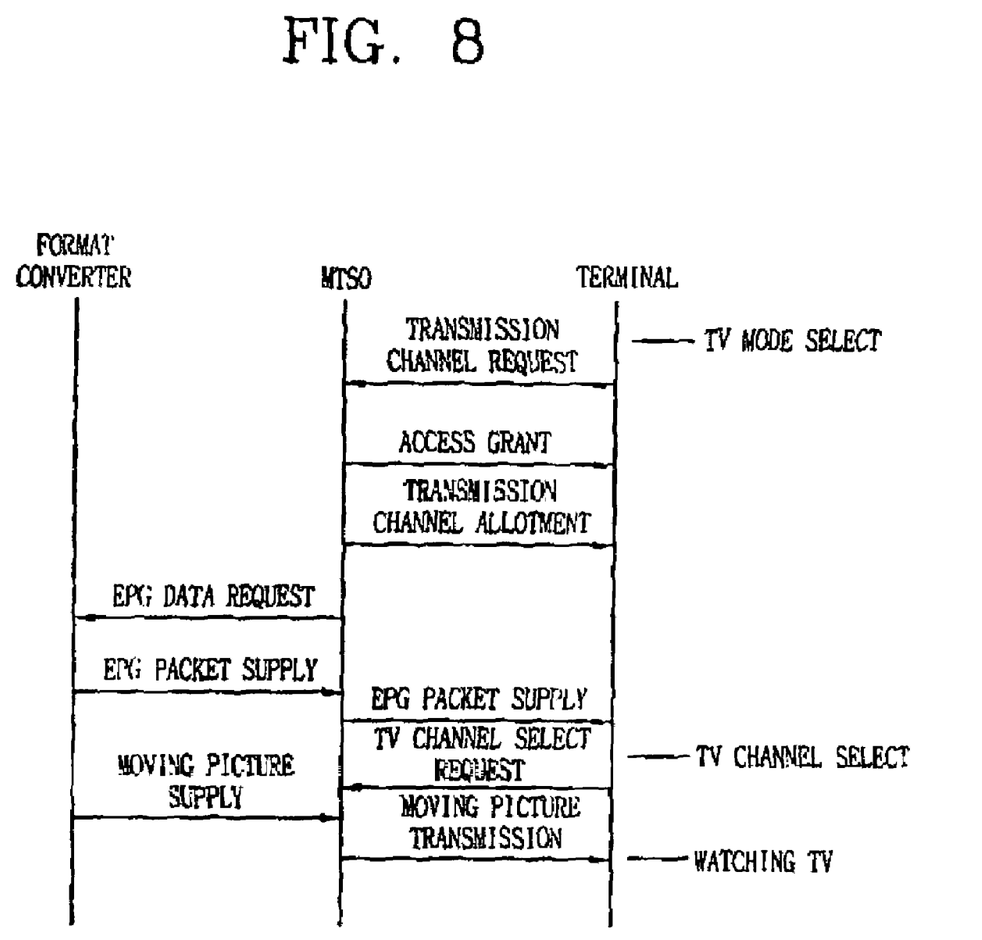
FIG. 8 is a flow chart illustrating the control process of the broadcasting service of the present invention.

FIG. 8 is a flow chart illustrating the control operation of the broadcasting service of the present invention. It shows a certain process for the receiving television signals between the terminal of FIG. 7 and the broadcasting service system using the mobile communication of the present invention.

In FIG. 7 and FIG. 8, operations will be described. The EPG data is transmitted to the subscriber for answering the subscriber request, the format-converted signal based on the EPG data is transmitted to the subscriber in accordance with the subscriber select program through the allotted channel.

At the same time, payment authorization is demanded of the subscriber, thus ensuring that the subscriber has the right to watch the digital television broadcasting. It is also assumed a mobile communication company has a designated telephone number to handle subscriber requests and to perform a key word certification process for confirming the subscriber.

First, when the mobile communication terminal subscriber wants to receive the digital television broadcasting through the subscribed mobile communication network, the subscriber sets up the TV reception mode by using the key input unit 711, and then connects to the designated telephone number of the mobile communication company.

After the connection completion, the subscriber confirms that he is a certified subscriber having the right to receive the digital television broadcasting by inputting the pass word.

When the subscriber is certified, access is granted, and the pertinent channel for watching moving picture is allotted.

After that, the server MTSO requires the EPG data to the format converter.

As an answer for the EPG data request, the format converter provides the EPG data packet to the server MTSO. The server MTSO transmits the EPG data packet to the subscriber through the pertinent channel.

Herein, the EPG data packet can have the format used in the wireless internet network.

The EPG data packet received on the antenna 701 is decoded on the video encoding and decoding unit 704 through the video processing unit 707, and the decoded result shows on the monitor 708 through the video processing unit 707. The subscriber answers it by searching the EPG data, and selects a channel.

In order to provide a subscriber search capability, a web browser is provided on the terminal (processor) for searching the EPG and additional information.

The channel select information is inputted to the processor 709 through the key input unit 711, the processor 709 coding-controls the pertinent signal and transmits it to the server through the RF reception and transmission unit 702 and antenna 701.

The server MTSO requires the video and audio data corresponding to the selected channel by the subscriber to the format converter, the format converter outputs the video and audio data, and transmits it to the subscriber through the mobile communication network.

In order to watch the television broadcasting by using the mobile communication network, the transmitted television broadcasting signal is sent to the video encoding and decoding unit 704 of the terminal 112 through the antenna 701 and RF reception unit 702. As described above, the video encoding and decoding unit 704 performs the MPEG4 decoder function, and accordingly decodes, outputs the video and audio to the monitor 708 and speaker SP through the each processing unit 707, 706.

Meanwhile, after the subscriber certification, the server can perform payment demand by using the subscriber certification key word, such as an ID.

Herein, the television broadcasting signal transmission to the certain channel (changeable channel) is opened and continues between the server and subscriber as described. However, as described above, it is also possible to perform the television broadcasting using the mobile communication of the present invention by allotting a certain channel for the television broadcasting.

As described above in detail, the present invention is capable of transmitting moving picture information by using the mobile communication network, displaying the television on a subscriber's mobile communication terminal, transmitting the EPG data in answer to a subscriber's request, and providing the selected broadcast program from the data to the subscriber in real time.

In addition, the subscriber can choose the television broadcast, watch the selected broadcast by using a mobile communication terminal, such as a cellular phone, PCS, and IMT2000.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A broadcasting service system for receiving television broadcasts and providing them directly to a mobile cellular network transmitting means and via that transmitting means to a mobile telephony terminal, comprising:
   a broadcast television receiver means for receiving a broadcast television signal;
   a converting means for converting the received broadcast television signal into a video and audio signal in a format compatible with a signal and transmission standard of the mobile cellular telephone network and for providing the converted format video and audio signal directly to the mobile cellular network transmitting means; and
   wherein the mobile cellular network transmitting means is adapted to transmit the thusly converted video and audio signal to a mobile cellular telephone network subscriber via a transmission channel of the mobile cellular telephone network,
   wherein the transmitting and converting means transmits data through a connected transmission channel between a mobile telephone subscriber terminal and a base station of the mobile cellular telephone network.

2. The broadcasting service system according to claim 1, wherein the television broadcast signal complies with a first signal standard for television broadcasting, the converted digital video and audio signal formats compatible with the mobile cellular telephone network comply with a second signal standard, and the first and second signal standards agree with a signal standard which is capable of converting between different transmission systems.

3. The broadcasting service system according to claim 2, wherein the first signal standard is the MPEG-2 (Moving Picture Experts Group 2) standard, and the second signal standard is one of the MPEG-4 (Moving Picture Experts Group 4), H.26L, H.263, and H.26X standards.

4. The broadcasting service system according to claim 1, wherein the converting means comprises a transcoder which includes a decoding means which decodes digital video and audio data complying with a digital television broadcasting standard and then encodes the thusly decoded video and audio data into a format compatible with transmission over a communication channel of the mobile cellular telephone network, and a converting-controlling means which controls an encoding rate of the transcoder to comply with a transmission rate of the mobile cellular telephone network.

5. The broadcasting service system according to claim 1, wherein the converting means includes a digital signal converting means which converts an analog television broadcast signal into digital video and audio data, an encoding means which formats the thusly converted digital video and audio data and encodes it for compatibility with the transmission standard of the mobile cellular telephone network, and a converting-controlling means which controls an encoded data rate of the encoding means in order to agree with a transmission rate of the mobile cellular telephone network.

6. The broadcasting service system according to claim 5, wherein the transmitting means includes a means for putting the formatted digital video and audio signal onto the transmission channel of the mobile cellular telephone network, and a formatting-transmission means which formats and transmits the digital video and audio data with additional broadcasting information.

7. The broadcasting service system according to claim 6, wherein EPG (Electronic Program Guide) data is formatted and transmitted with the video and audio data and additional information.

8. A broadcasting service system using a mobile cellular telephony terminal, comprising:
   a digital video and audio input means which is provided a digital video and audio signal from a provider;
   a transcoding means which converts the provided digital video and audio signal inputted from the digital video and audio input means into a format and transmission rate compatible with transmission over a transmission channel of the mobile cellular telephone network and provides the converted format video and audio signal directly to an allocating transmitting means;
   an encoding-converting means for encoding digital data converted by the transcoding means;
   a transmitting means which transmits the thusly transcoded-converted digital broadcasting signal provided directly to the allocating transmitting means on an allotted channel of the mobile cellular telephone network;
   an EPG (Electronic Program Guide) data converting means for converting EPG data for selecting a digital television broadcasting channel into a format compatible with transmission over the mobile cellular telephone network; and
   an additional information converting means for converting the additional information of the digital television broadcasting channel into a format compatible with transmission over the mobile cellular telephone network.

9. The broadcasting service system according to claim 8, wherein the broadcasting service system transmits the EPG (Electronic Program Guide) data and additional information in compatible formats for the mobile cellular telephone network.

10. The broadcasting service system according to claim 8, wherein the EPG (Electronic Program Guide) data converting means comprises:

a decoding means for decoding an inputted EPG (Electronic Program Guide) data stream of a digital television broadcasting signal;

a restoring means for restoring the EPG data of the decoded data stream;

a database means which stores information corresponding to the restored EPG data;

an EPG information outputting means for outputting EPG information from the database means corresponding to a mobile cellular telephone network subscriber request; and a converting means for converting the additional information of the digital television broadcasting signal into a format compatible with transmission via the mobile cellular telephone network.

11. A broadcasting service system for enabling the reception of television broadcasts by a mobile cellular telephone subscriber terminal, comprising:

a digital signal processing means for receiving a digital television broadcasting signal and providing a television broadcasting program to a mobile cellular telephone network;

a medium storing means for storing broadcast information processed by the digital signal processing means;

a data processing and converting means for converting EPG (Electronic Program Guide) data and additional information of the digital television broadcasting signal processed by the digital signal processing means into a signal format compatible with transmission via the mobile cellular telephone network; and a transcoder and transmission means for receiving video and audio data and additional information processed by the digital signal processing means, converting them into a signal format compatible with transmission over the mobile cellular telephone network and transmitting the thusly converted data and information over a transmission channel of the mobile cellular telephone network.

12. The broadcasting service system according to claim 11, wherein the digital signal processing means comprises:

a tuner for selecting a digital television broadcasting signal carried on a transmission medium;

a demodulating means for restoring the selected digital television broadcasting signal;

a demultiplexer for fetching EPG (Electronic Program Guide) and additional information from the demodulated digital television broadcasting signal; and a decoder for decoding the video and audio data from the demodulated digital television broadcasting signal.

13. The broadcasting service system according to claim 11, wherein the data processing and converting means comprises:

an EPG (Electronic Program Guide) data decoding means for decoding EPG (Electronic Program Guide) data of the digital television broadcasting signal;

a signal converting means for converting the decoded EPG data into a signal format compatible with transmission over the mobile cellular telephone network;

a protocol converting means for converting the converted EPG data into a protocol compatible with the mobile cellular telephone network;

a decoding means for decoding the additional information of the digital television broadcasting signal;

an additional information signal converting means for converting the decoded additional information into a format compatible with transmission over the mobile cellular telephone network; and an additional information protocol converting means for converting the converted additional information into a protocol compatible with the mobile cellular telephone network.

14. The broadcasting service system according to claim 11, wherein the transcoder and transmission means comprises:

a transcoder for transcoding video and audio data of a digital television broadcasting signal into a format compatible with transmission over a transmission channel of the mobile cellular telephone network;

a transmission rate control means for controlling a transmission rate of the transcoder to comply with the transmission channel of the mobile cellular telephone network;

a converting means for converting the output of the data processing and converting means into a data protocol agreeable to the mobile cellular telephone network;

a synchronization processing means for synchronizing synchronization request information during the transcoding and protocol converting operations; and a transmitting means for transmitting the processed data in real time by allotting it a transmission channel of the mobile cellular telephone network.

* * * * *